Jan. 10, 1939.  G. K. SZIKLAI  2,143,392
ELECTRODE
Filed April 9, 1936
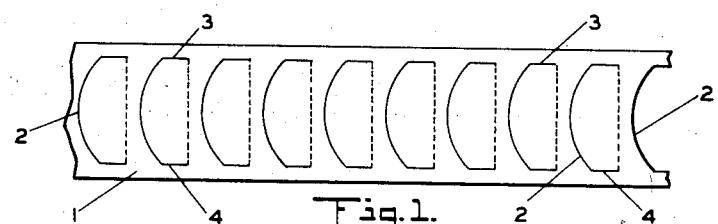
Fig.1.
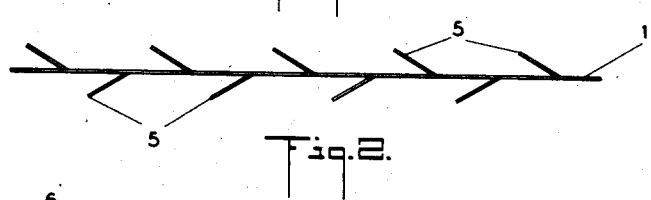
Fig.2.
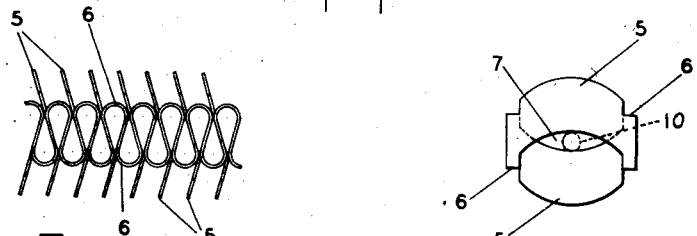   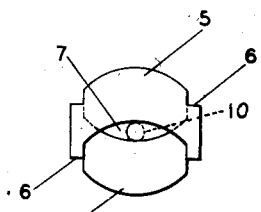
Fig.3.  Fig.4.
Fig.5.
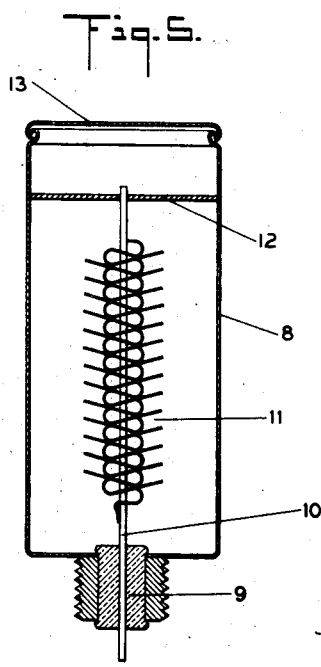
George K. Sziklai
INVENTOR
BY John J. Kogan
ATTORNEY Patented Jan. 10, 1939

2,143,392

UNITED STATES PATENT OFFICE 2,143,392

ELECTRODE

George K. Sziklai, New York, N. Y., assignor to Electro-Mechanical Research, Inc., Brooklyn, N. Y., a corporation of New York Application April 9, 1936, Serial No. 73,485

6 Claims. (Cl. 175—315)

This invention relates to electrodes and more particularly to an improved form of electrode for electrolytic devices.

Various forms of electrodes have been proposed heretofore for electrolytic devices such as condensers, electrolytic cells, lightning arresters and the like. In all these prior electrodes the object has been to provide as large an active area in a minimum of volumetric space. Thus one suggested form of electrode consists of a spirally convoluted metal ribbon. However this type of electrode has the disadvantage that approximately half of its surface is turned away from the cooperating or surrounding electrode, resulting in a high power factor for the condenser, and a higher internal impedance, especially at radio frequencies. It has been proposed to remedy these disadvantages by perforating the electrode strip so as to shorten the electrolytic path. Aside from the waste of material resulting from these perforations, is the resultant mechanical weakening of the spiral electrode, and the reduction in the internal impedance is at the expense of a reduction in the active area of the electrode. Furthermore the spiral type of electrode requires that not only the inner convolution be supported, but also the outer convolutions thus requiring relatively complex and expensive supporting and/or lining arrangements to prevent contact between the electrodes and between the separate convolutions of the spiral.

In an effort to overcome the disadvantages of the spirally convoluted electrode, it has been proposed to make the electrode out of a relatively wide metal strip which is corrugated throughout its length. There again is presented the problem of adequately supporting the electrode throughout its length, and even if the corrugated electrode is designed to press at opposite ends against the surrounding electrode, it becomes necessary to employ liners or the like to prevent short-circuiting of the electrodes. This type of electrode has the further disadvantage that it is wasteful of space when it is used on the interior of a cylindrical container which also acts as an electrode.

Accordingly it is one of the principal objects of the present invention to provide an electrode for electrolytic devices and the like, which provides a very efficient relation between space occupied and active electrode area, and which is capable of being readily supported within an enclosing container.

A further object is to provide an electrode having a substantially circular periphery and which is formed from a single length of metal ribbon or metal strip.

A feature of the invention relates to an electrode for electrolytic devices consisting of a plurality of disc-like sections spaced apart by spacer members, the disc-like sections and the spacers being formed from a single length of metal strip.

Another feature relates to an electrode for electrolytic devices consisting of a plurality of substantially parallel spaced disc-like members which are formed from a metal strip and which are centrally supported by a single support rod or the like whereby the internal impedance of the device is maintained at a low value.

A still further feature relates to the novel organization, arrangement and relative location of parts which go to make up an efficient electrolytic device such as a condenser, and which is relatively inexpensive to manufacture and assemble and is highly stable in operation.

Other features and advantages not specifically enumerated will be apparent after a consideration of the following detailed descriptions and the appended claims.

In the drawing which illustrates one preferred embodiment of the invention,

Fig. 1 is a plan view of a metal strip showing one stage in the formation of an electrode according to the invention.

Fig. 2 illustrates a succeeding step in the electrode formation.

Fig. 3 illustrates a further step in the electrode formation.

Fig. 4 is an end view of the finished electrode.

Fig. 5 is a vertical sectional view of a condenser showing an electrode according to the invention, mounted therein.

While the invention will be described herein as embodied in one known type of electrolytic condenser such for example as a wet-type or liquid electrolyte condenser, wherein the container for the electrolyte also acts as one of the condenser electrodes, it will be understood that this is done merely for explanatory purposes and not by way of limitation. In accordance with the invention the improved electrode is preferably made from a single strip or sheet of metal as represented in Fig. 1 by the numeral 1. This strip may be of any metal usually employed in electrolytic condensers such for example as aluminum, tantalum, and the like. The metal strip is then slitted at equally spaced points, each slit being constituted of an arcuate portion 2 and parallel lateral portions 3 and 4. Preferably, although not necessarily, the arcuate portion 2 is formed as a circular arc for reasons that will appear from the subsequent description. The slitted strip is then supported on a suitable support member, such for example as a block having a series of windows corresponding in shape to the tabs which are formed by the slitted sections of the metal strip. By a suitable tool, the tabs or slitted portions of the metal strip are then bent out of the plane of the strip as indicated in Fig. 2 so that only alternate tabs extend in the same angular direction. The strip with the offset tabs 5 is then folded or corrugated as indicated in Fig. 3 so that the tabs extend outwardly substantially radially from the corrugated strip and the corrugation is preferably effected so that the tabs on each side of the strip are substantially parallel and in alignment with one another. The folded or corrugated portions 6 of the strip then serve as spacer members between the tabs 5, thus preventing the tabs from touching each other.

As will be seen from Fig. 4, the strip when folded as above-described, presents a clear internal passage 7 extending along its length, and this passage may be used to receive a support rod as illustrated in Fig. 5. By properly designing the shape of the slits, 2, 3, 4 it is possible to give the electrode a substantially circular periphery as illustrated in Fig. 4 and each tab forms with the next adjacent tab a substantially circular disc-like electrode section.

Referring to Fig. 5 the electrode formed as above-described, is mounted within a metal container 8 which may also serve as one of the condenser electrodes and for this purpose the container may be of any metal. Thus the container 8 may be of commercially pure aluminum and may act as the cathode of the condenser. The lower end of the container may be provided with an insulator plug 9 into which is sealed the electrode supporting rod 10. Rod 10 may be of aluminum or other film-forming metal and it passes through the passage 7 in the folded strip electrode described above. The ends of the metal strip may be permanently fastened to the rod 10 as by riveting, welding, or if desired the ends of the strip electrode may be provided with eyelets which may be fastened in any suitable manner to the rod 10. The rod 10 and consequently the electrode 11 is held in its axial or central position within the container by means of a disc 12 of insulation having a perforation to receive the upper end of rod 10. Disc 12 may be held in place either by being fastened or supported on the container wall, or if desired the rod 10 may be fastened to the disc which may be of substantially the same diameter as the internal diameter of the container 8. The top of the container may then be provided with a cover 13 preferably provided with any well-known form of gas vent.

With the arrangement just described the electrode 11 has a maximum of its area in active relation with the electrode 8 and it is at all times accurately and permanently centered with respect to electrode 8, by being firmly supported at both ends. In addition to the mechanical advantages of this arrangement there are definite electrical advantages. Since practically the entire surface of electrode 11 faces electrode 8, the electrolytic path between the electrodes can be very short and the internal impedance and the power factor of the condenser are very low. Furthermore since the several disc-like sections of electrode 11 are formed from the same strip of metal and are spaced apart by the intervening folded portions of the strip, there is very little chance of the condenser varying in capacity, as might be the case if the disc-like members were separate and individually fastened to rod 10. It will be understood of course that the invention is not limited to any particular electrolyte that may be used in the container 8 and furthermore it is not limited to a cylindrical container as it will be obvious that if desired, the disc-like sections of electrode 11 may be given any desired shape depending upon the contour of the slitted portions 2 (Fig. 1). Consequently various changes and modifications may be made herein without departing from the spirit and scope of the invention.

What I claim is:

1. An electrode of the character described consisting of a strip of metal having a series of spaced tabs struck out therefrom with successive tabs extending in opposite directions from the body of the strip, said strip having folds between alternate tabs to maintain said alternate tabs in spaced relation.

2. An electrode of the character described consisting of a strip of metal having a series of spaced tabs struck out therefrom, the edges of the strip from which the tabs are struck out defining corresponding windows, the strip having folds between alternate tabs so that successive windows overlap to form a central passage for a support member.

3. An electrode of the character described consisting of a strip of metal having a series of spaced tabs struck out therefrom, the edges of the strip from which the tabs are struck out defining corresponding windows, successive tabs extending out of the plane of the strip in opposite directions and the strip having folds located between alternate tabs and with the windows overlapping, alternate tabs being spaced apart by the intermediate fold in the strip.

4. An electrode of the character described consisting of a corrugated metal strip having portions struck out from the body thereof to provide radially extending disc-like members with the edges of the portions of the strip from which the tabs are struck out forming corresponding windows, the strip having corrugations between alternate tabs and the corrugations being such that the said windows overlap to form a longitudinal passage for a support rod.

5. In a device of the character described, the combination of a container, an electrode within said container, said electrode comprising a corrugated strip of metal having integrally struck out tabs extending outwardly therefrom with the edges of the strip from which the tabs are struck out forming corresponding windows, the corrugations in the strip being arranged so that said windows overlap to form a passage extending therethrough, a support member extending through said passage, and means to insulatingly support said member centrally within said container.

6. In a device of the character described, the combination of a metal container, an electrode within said container, said electrode comprising a corrugated strip of metal having a plurality of integral radially struck out tabs with the edges of the portions of the strip from which the tabs are struck out defining corresponding windows, the corrugations being arranged so that said windows overlap to form a passage extending therethrough, a support rod in said passage and to which the electrode is fastened at its end, and means to support said rod and electrode centrally within said container, the last-mentioned means including a disc of insulation through which said rod passes, said disc being supported by the wall of said container.

GEORGE K. SZIKLAI.